(12) United States Patent
Belford et al.

(10) Patent No.: US 7,681,805 B2
(45) Date of Patent: Mar. 23, 2010

(54) IRRIGATION DRIPPER AND PIPE

(75) Inventors: James Wallace Belford, Kibbutz Magal (IL); Jacob Dan Retter, Kibbutz Hatzerim (IL); Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 3 days.

(21) Appl. No.: 12/155,518

(22) Filed: Jun. 5, 2008

(65) Prior Publication Data
US 2008/0237374 A1 Oct. 2, 2008

Related U.S. Application Data

(62) Division of application No. 11/062,739, filed on Feb. 23, 2005, now abandoned.

(51) Int. Cl.
*B05B 17/04* (2006.01)
(52) U.S. Cl. .......... 239/11; 239/542; 239/547; 239/550; 156/294; 156/514; 138/42
(58) Field of Classification Search .......... 239/542, 239/547, 550, 271, 272, 11; 156/213, 252, 156/270, 294, 513, 514; 138/42
See application file for complete search history.

(56) References Cited

U.S. PATENT DOCUMENTS

| | | | |
|---|---|---|---|
| 4,210,287 A * | 7/1980 | Mehoudar | 239/542 |
| 4,247,051 A * | 1/1981 | Allport | 239/542 |
| 4,369,923 A * | 1/1983 | Bron | 239/542 |
| 4,735,363 A | 4/1988 | Shfaram et al. | |
| 5,996,909 A | 12/1999 | Lin | |
| 6,039,270 A | 3/2000 | Dermitzakis | |
| 6,568,607 B2 * | 5/2003 | Boswell et al. | 239/542 |

FOREIGN PATENT DOCUMENTS

| | | |
|---|---|---|
| DE | 29 02 007 B1 | 4/1980 |
| EP | 1 541 014 A1 | 6/2005 |
| ES | 48 3222 A1 | 4/1980 |
| WO | WO 2005/122747 A2 | 12/2005 |

* cited by examiner

*Primary Examiner*—Dinh Q Nguyen
(74) *Attorney, Agent, or Firm*—Womble Carlyle

(57) ABSTRACT

A dripper adapted to be bonded to interior of an irrigation pipe during manufacture and to be associated with an outlet opening in said pipe. The dripper comprises an outwardly facing surface adapted for the bonding, an outlet area associated with the surface, and at least one bulge near the outlet area. The bulge defines an outermost portion of the surface at least during manufacture of the pipe, and is adapted to form, when the dripper is bonded to the pipe, a raised outlet region in the pipe associated with the bulge. The bulge and outlet area are designed so as to form the raised outlet region suitable for at least a part of the outlet opening to be formed therein and be defined by the material of the pipe.

24 Claims, 15 Drawing Sheets

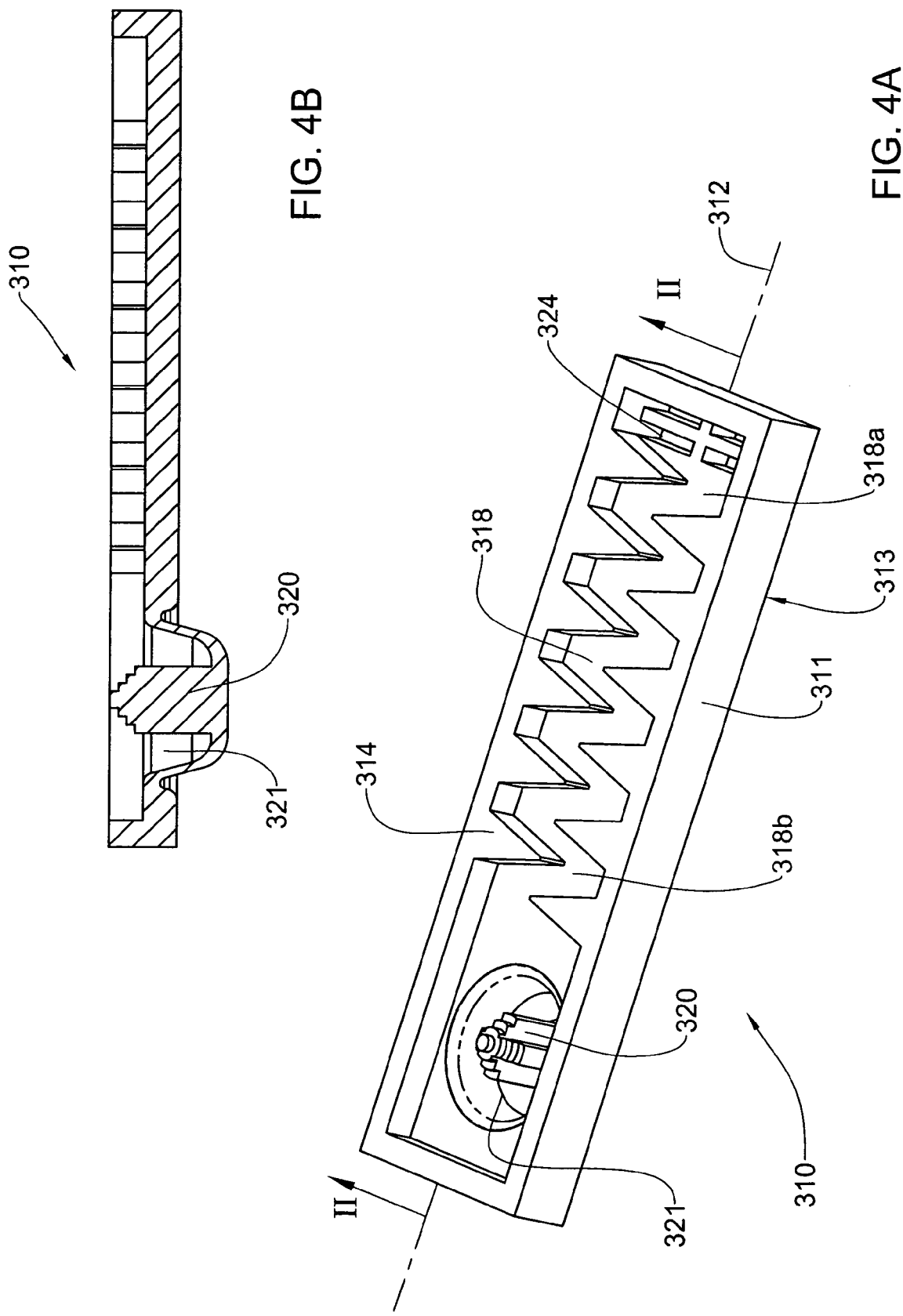

IRRIGATION DRIPPER AND PIPE

CROSS-REFERENCE TO PRIOR APPLICATIONS

This is a Divisional Patent Application of U.S. patent application Ser. No. 11/062,739 filed Feb. 23, 2005, the entire contents of which are hereby incorporated by reference in their entirety.

FIELD OF THE INVENTION

The present invention relates to irrigation drippers and, more particularly, to drippers fitted integrally in irrigation pipes, and to methods for production of such pipes.

BACKGROUND OF THE INVENTION

Drip irrigation systems are used for providing a controlled flow of water for irrigation purposes. They typically comprise an irrigation pipe with outlet openings formed therein for the purpose of allowing outflows of water. In addition, drippers or emitters are typically provided within the pipe (in-line or integral drippers) or on the pipe (on-line drippers) in association with the outlet openings to ensure an appropriate drip rate of water therethrough.

In-line drippers typically comprise an inwardly facing surface, which faces the interior of the pipe, an outwardly facing surface, which faces the interior of the pipe, a circumferential wall, a water inlet, which is in fluid communication with the interior of the pipe, and a water outlet, which is in fluid communication with an outlet opening in the pipe. The inlet and outlet of the dripper may be connected by a meandering channel, which is often in the form of a flow-restricting labyrinth.

During manufacture of the pipe with the in-line drippers bonded to the interior thereof, the outlet openings must be formed in the pipe at a precise location with respect to the drippers. This requires determining the location of each dripper, and then forming the opening in a precise spot corresponding to the outlet of the dripper.

U.S. Pat. No. 6,039,270 (US '270) discloses a solution to overcome the necessity for determining the location of drippers during manufacture. In an irrigation pipe disclosed in US '270, the drippers comprise a cylindrical end-tube projecting from their outwardly facing surface, which is used as an outlet of the dripper. Each dripper is attached to the interior of the pipe so that it is swollen at the location of the end-tube, with the end-tube and the corresponding area of the pipe projecting from the swollen portion. The production line is provided with a stationary cutting plate located at a pre-determined height relative to the pipe, which cuts the projecting part of the pipe with the end-tube, thus forming the outlet opening in the pipe at the location of the end-tube, i.e., the dripper's outlet.

SUMMARY OF THE INVENTION

In accordance with the present invention, there is provided a dripper adapted to be bonded to interior of an irrigation pipe during manufacture and to be associated with an outlet opening in the pipe. The dripper comprises an outwardly facing surface adapted for the bonding, an outlet area associated with said surface and at least one bulge near the outlet area. The bulge defines an outermost portion of the surface at least during manufacture of the pipe, and is adapted to form, when the dripper is bonded to the pipe, a raised outlet region in the pipe associated with the bulge. The bulge and outlet area in the dripper are designed so as to form the raised outlet region suitable for at least a part of said outlet opening being formed therein and being defined by the material of the pipe.

With the dripper designed according to the present invention, the bulge on the one hand allows for easy detection of the outlet region during manufacture of the pipe, and on the other hand allows at least part of the outlet opening to be formed solely from the material of the pipe. This allows the outlet opening to have a desired geometry, e.g., such as adapted to close, either completely or partially, when there is not sufficient water pressure in the pipe to cause an outflow of water, protecting the pipe from ingress of debris.

According to another aspect of the present invention, there is provided an irrigation pipe having outlet openings and a plurality of drippers. Each dripper comprises an outwardly facing surface bonded to the pipe's interior, an outlet area associated with said surface in fluid communication with at least one of said outlet openings, and at least one bulge near the outlet area. The pipe comprises a raised outlet region associated with the bulge. At least a part of the outlet opening is formed in the raised outlet region and is defined by the material of the pipe.

According to a still further aspect of the present invention, there is provided method for producing an irrigation pipe. The method comprises the steps of bonding a dripper as described above to the interior of the pipe so that a raised outlet region of the pipe is formed. The outlet area of the dripper is spaced from the raised outlet region of the pipe. The pipe is cut at the raised outlet region at a location, spaced from the bulge, to form there at least a part of an outlet opening defined by the material of the pipe.

According to a further aspect of the present invention, there is provided a blade for producing an outlet opening in an irrigation pipe as described above. In accordance with one specific embodiment, the blade comprises a guide with a longitudinal axis, at least part of which is adapted to receive the raised outlet region of the pipe while allowing the pipe to move in a direction along the axis. The blade further comprises a cutting arrangement, which is adapted to cut the pipe at its outlet region to provide said outlet opening. The guide may have a channel disposed along the axis, and the blade may further comprise a notch at a proximal end thereof, the notch and the channel merging, and the cutting arrangement being located at this merge.

According to a still further aspect of the present invention, there is provided a method for producing an irrigation pipe, using the above-described blade. According to this method, the pipe is passed along the axis, so that the raised portion is received within the guide. When the raised portion passes by the cutting arrangement, it is cut thereby to form the outlet opening.

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 4A is a perspective view of another embodiment of a dripper according to the present invention;

FIG. 4B is a cross-sectional view of the dripper shown in FIG. 4A taken through line II-II;

DETAILED DESCRIPTION OF THE INVENTION

Figure 1A:
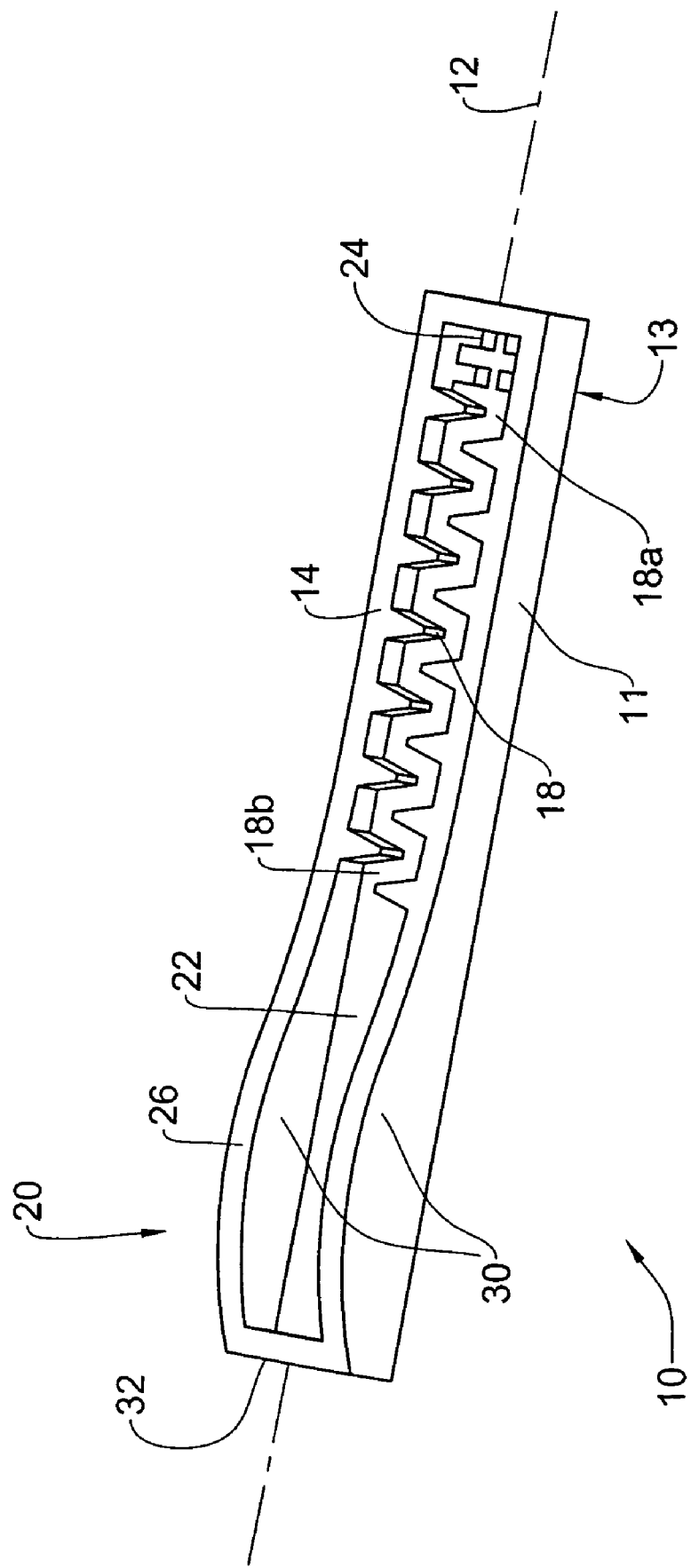
FIG. 1A is a perspective view of one embodiment of a dripper according to the present invention.

FIG. 1A illustrates an elongated dripper 10 according to one embodiment of the present invention. The dripper 10 has a longitudinal axis 12 and comprises an inwardly facing base surface 13 having apertures 24, an outwardly facing surface 14 extending along the axis 12, a circumferential surface 11, and a meandering channel 18 having an upstream portion 18a and a downstream portion 18b. The outwardly facing surface 14 is intended for bonding to the interior of an irrigation pipe (not shown in FIG. 1A). The apertures 24 are in fluid communication with the upstream portion 18a of the meandering channel 18 and with the interior of the pipe, and serve as an inlet for the dripper 10. It should be noted that the apertures 24 may be of any number, formed at any suitable location on the dripper, and be of any suitable design. The dripper 10 further has an outlet area 22 in fluid communication with the downstream portion 18b of the meandering channel 18.

The dripper 10 further comprises a bulge 20 near the outlet area 22. The bulge 20 is constituted by two spaced apart projections 30 parallel to and on both sides of the axis 12, and a connecting wall 32 orthogonal thereto, whose upper surfaces 26 constitute portions of the outwardly facing surface 14.

Figure 1B:
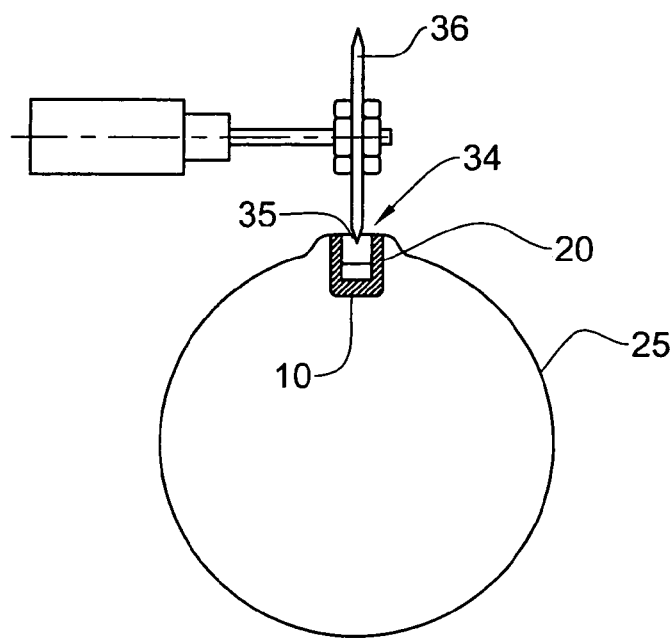
FIGS. 1B and 1C are cross-sectional views of an irrigation pipe with the dripper of FIG. 1A bonded thereto, taken respectively during cutting an outlet opening therein and after the outlet opening has been formed.
Figure 1C:
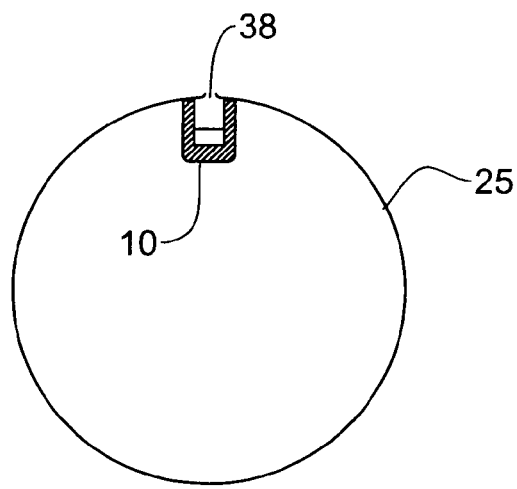
Figure 1D:
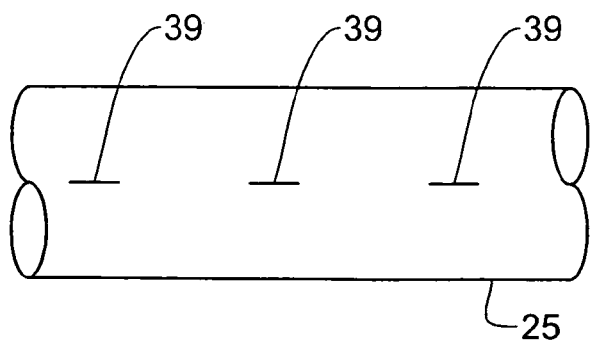
FIG. 1D is a top view of a section of pipe, having the dripper of FIG. 1A bonded interior thereto, after outlet openings have been cut therein.

As shown in FIG. 1B, when the outwardly facing surface 14 together with the upper surfaces 26 is bonded to the pipe, there is formed a raised portion 34 defined by the projections 30 of the bulge 20, with an outlet region 35 therebetween. In operation, also illustrated in FIG. 1B, fixed blade 36, either rotating or motionless, is positioned so that the raised portion 34 is engaged thereby at the region 35. As shown in FIG. 1C, a slit 39 is cut into the pipe 25 at the outlet region 35 of the dripper 10, forming thereby an outlet opening 38 in fluid communication with the outlet area 22 of the dripper 10. The slit 39, as seen from the outside of the pipe, is illustrated in FIG. 1D.

Forming the outlet opening 38 as a slit enables it to remain closed in the absence of pressure in the pipe. This helps keep dirt and other debris from clogging the opening. When water is flowing through the pipe under pressure, it opens the outlet opening 38, permitting an outflow of water therethrough.

Figure 2A:
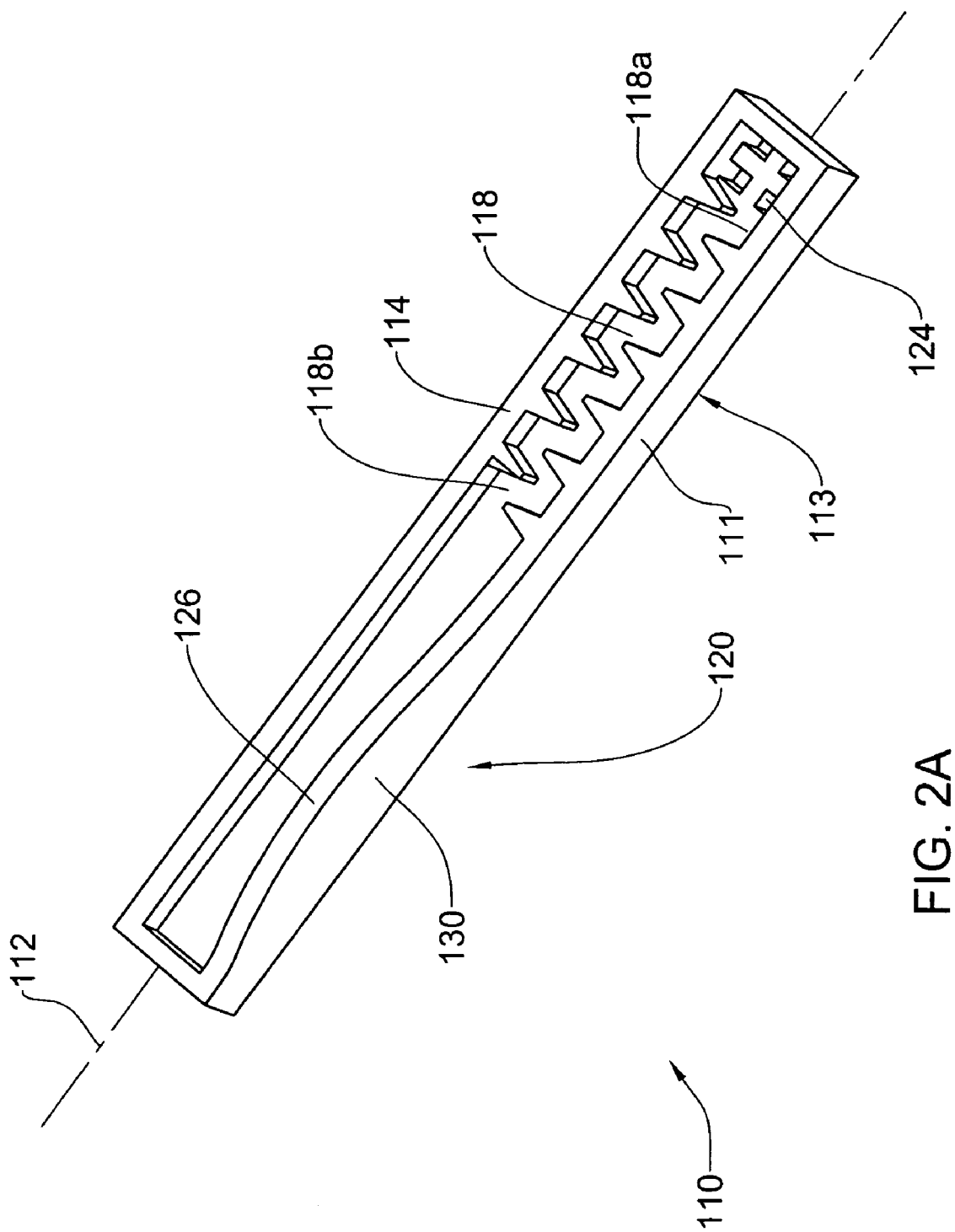
FIG. 2A is a perspective view of another embodiment of a dripper according to the present invention.

FIG. 2A illustrates a dripper 110 according to another embodiment of the present invention, which is generally similar to the dripper shown in FIG. 1A, with the exception of the structure of the bulge 120. Analogous elements are given the same reference numerals as those of FIG. 1A, however shifted by 100 (10 to 110, 34 to 134, etc.). The bulge 120 comprises one projection 130, which is generally parallel to the axis 112, and on one side thereof. The projection has an upper surface 126, constituting a portion of the outwardly facing surface 114.

Figure 2B:
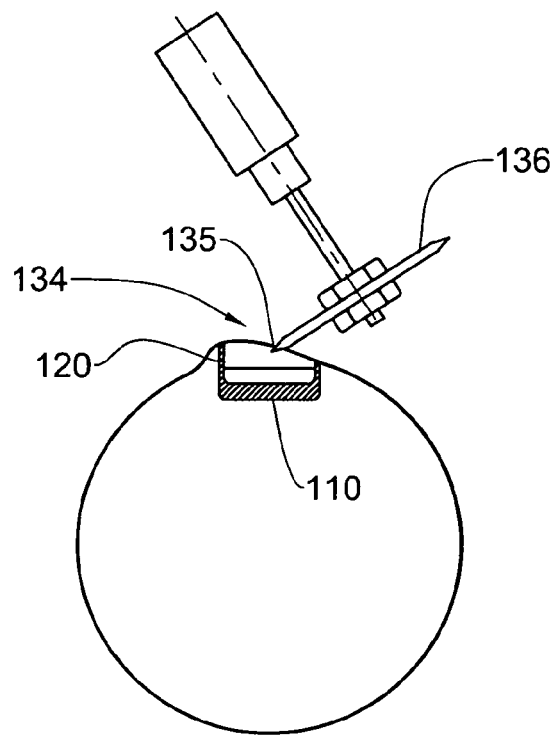
FIGS. 2B and 2C are cross-sectional views of an irrigation pipe with the dripper of FIG. 2A bonded thereto, taken respectively during cutting an outlet opening therein and after the outlet opening has been formed.
Figure 2C:
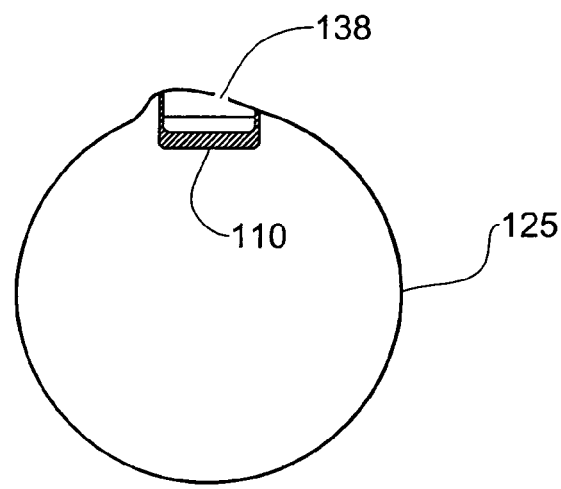
Figure 2D:
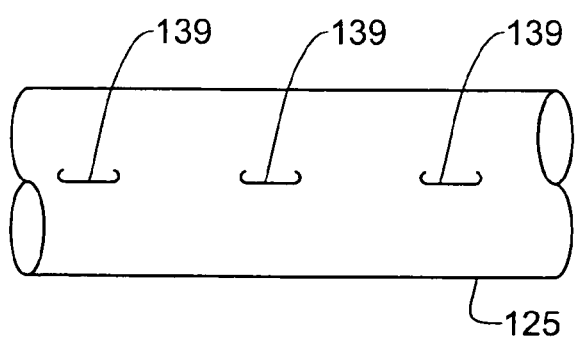
FIG. 2D is a top view of a section of pipe, having the dripper of FIG. 2A bonded interior thereto, after outlet openings have been cut therein.

As shown in FIG. 2B, when the outwardly facing surface 114 together with the upper surface 126 is bonded to the pipe, there is formed a raised portion 134, defined by the projection 130 of the bulge 120, with an outlet region 135 adjacent thereto. A fixed blade 136, either rotating or motionless, is positioned so that the raised portion 134 is engaged thereby at the region 135. As shown in FIG. 2C, a slit 139 is cut into the pipe 125 at the outlet region 135 of the dripper 110, forming thereby an outlet opening 138 in fluid communication with the outlet area 122 of the dripper 110. The slit 139, as seen from the outside of the pipe, is illustrated in FIG. 2D. It should be noted that by disposing the blade 136 an angle, the slits are formed so as to constitute flaps.

Figure 3A:
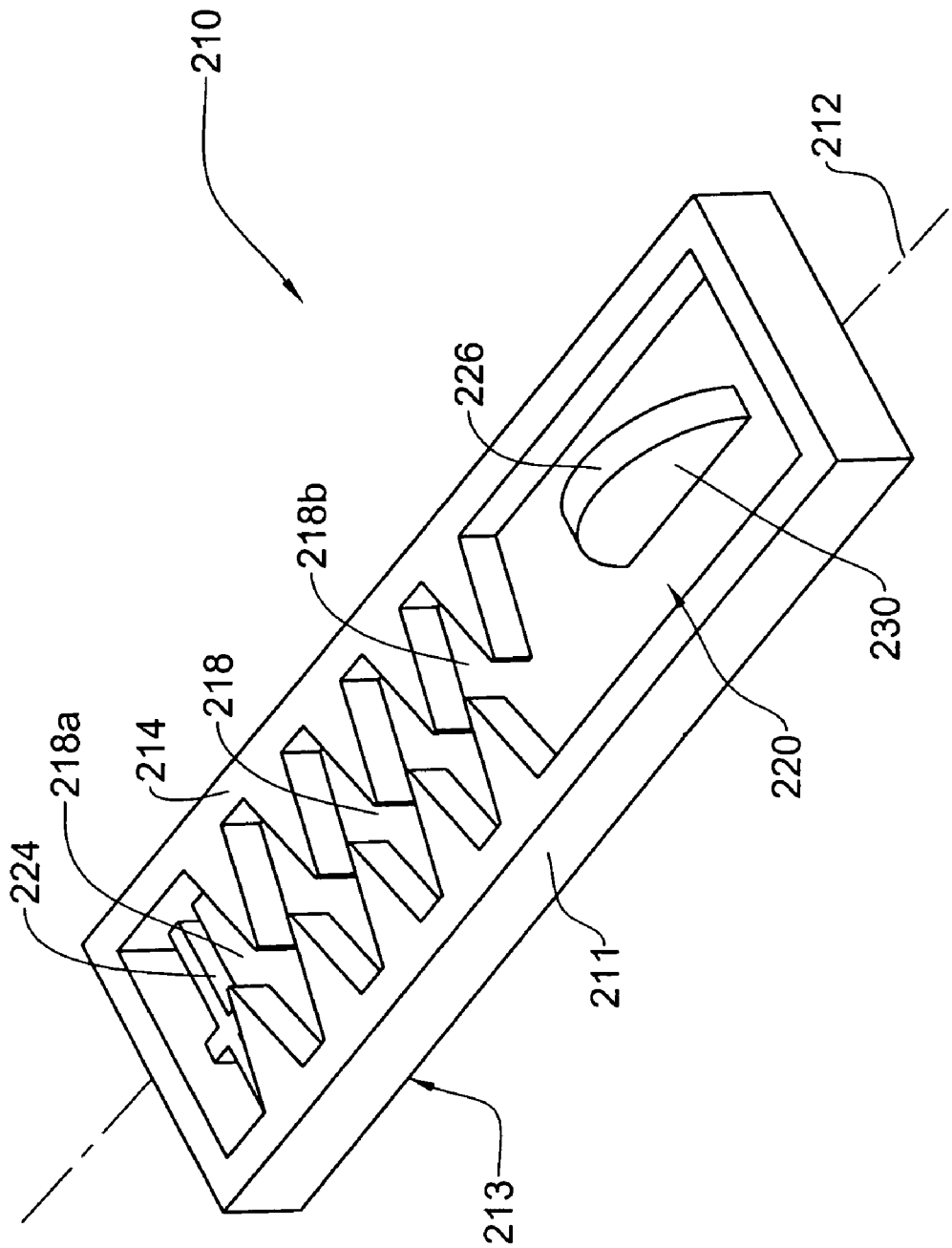
FIG. 3A is a perspective view of another embodiment of a dripper according to the present invention.

FIG. 3A illustrates a dripper 210 according to a further embodiment of the present invention, which is generally similar to the dripper shown in FIGS. 1A and 2A. Analogous elements are given the same reference numerals as those of FIG. 1A, however shifted by 200 (10 to 210, 34 to 234, etc.). However, the design of the bulge 220 differs from those described above. According to the present embodiment, the bulge 220 comprises one projection 230, which is disposed along the longitudinal axis 212 of the dripper 210.

Figure 3B:
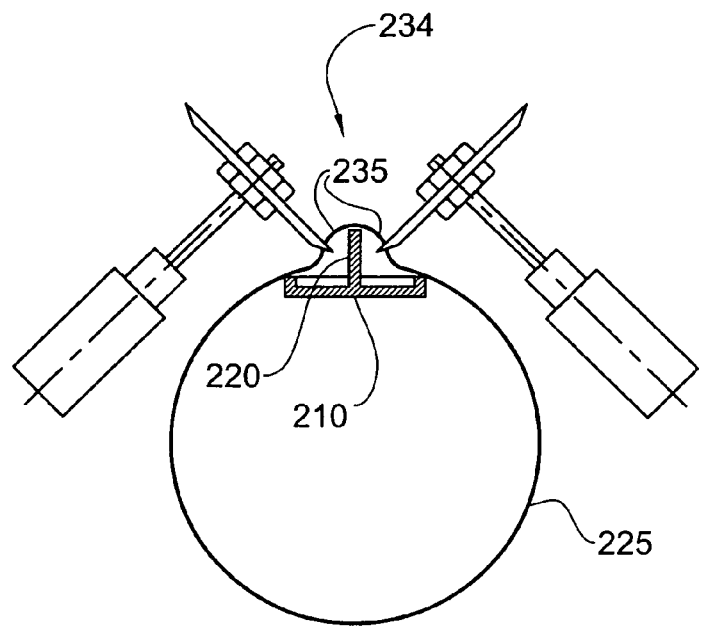
FIGS. 3B and 3C are bonded thereto, taken respectively during cutting an outlet opening therein and after the outlet opening has been formed.
Figure 3C:
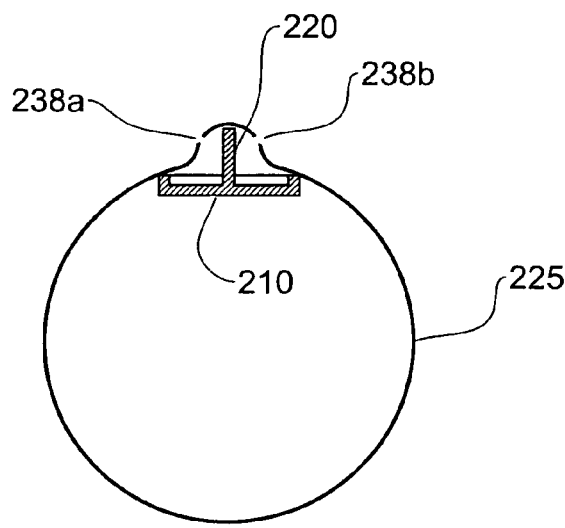
Figures 3D, 3E:
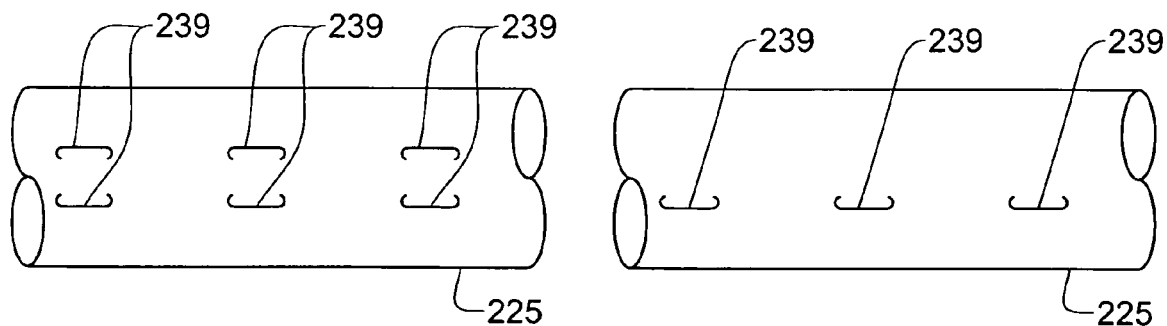
FIGS. 3D and 3E are top views of a section of pipe, having the dripper of FIG. 3A bonded interior thereto, after outlet openings have been cut therein.

As shown in FIG. 3B, when the outwardly facing surface 214 together with the upper surface 226 is bonded to the pipe, there is formed a raised portion 234, defined by the projection 230 of the bulge 220, with an outlet region 235 adjacent thereto. A fixed blade 236, either rotating or motionless, is positioned so that the raised portion 234 is engaged thereby at the region 235. As shown in FIG. 3C, slits 239 are cut into the pipe 225 at the outlet region 235 of the dripper 210, forming thereby outlet opening 238a and 238b, each in fluid communication with the outlet area 222 of the dripper 210. The slits 239, as seen from the outside of the pipe, are illustrated in FIG. 3D. Alternatively, only one blade 236 may be used, and one slit 239 is formed at each dripper, as illustrated in FIG. 3E. It should be noted that by disposing the blade 136 an angle, the slits are formed so as to constitute flaps.

Figure 4C:
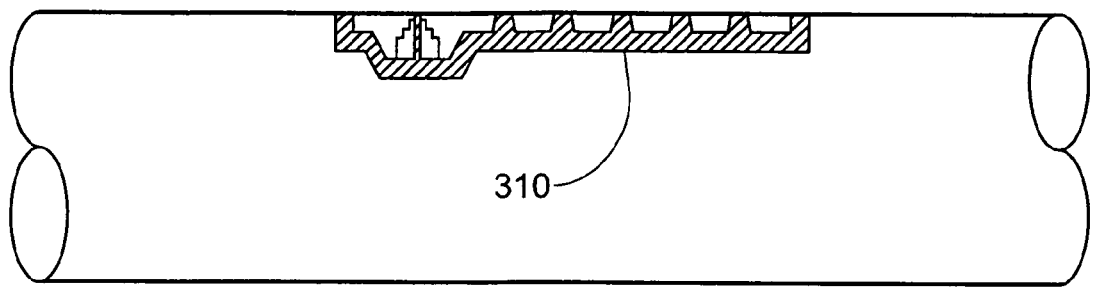
FIG. 4C is a side sectional view of the dripper shown in FIG. 4A, immediately after bonding.

FIGS. 4A and 4B illustrate another embodiment of the present invention. Once bonded to the pipe and ready for use, the dripper 310 is substantially similar to the dripper 210 illustrated in FIG. 3A. Analogous elements are given the same reference numerals as those of FIG. 1A, however shifted by 300 (10 to 310, 34 to 334, etc.) Thus, the dripper 310 has a longitudinal axis 312, a base surface 313 and a circumferential surface 311. A meandering channel 318 extends between an upstream portion 318a and a downstream portion 318b. Apertures 324 are formed in the base surface 313 proximate the upstream portion 318a. An upper facing surface 324 is intended for bonding to the interior of the irrigation pipe. The main difference is the design of the bulge 320. According to present embodiment, the dripper 310 is formed with an element 320 which is movable from a first, retracted position in which it is no higher than the upper facing surface 314, to a second, extended position in which the element 320 projects above the upper facing surface 314, thereby constituting a bulge 320. When in the retracted position, the element 320 is located in a recessed portion 321 of the dripper 310, so that before manufacture of the pipe, the top 320a of the element 320 does not project above the upper facing surface 314. As such, prior to manufacture, no portion of the pipe is raised above the upper facing surface 314, as is shown in FIG. 4C.

Figure 4D:
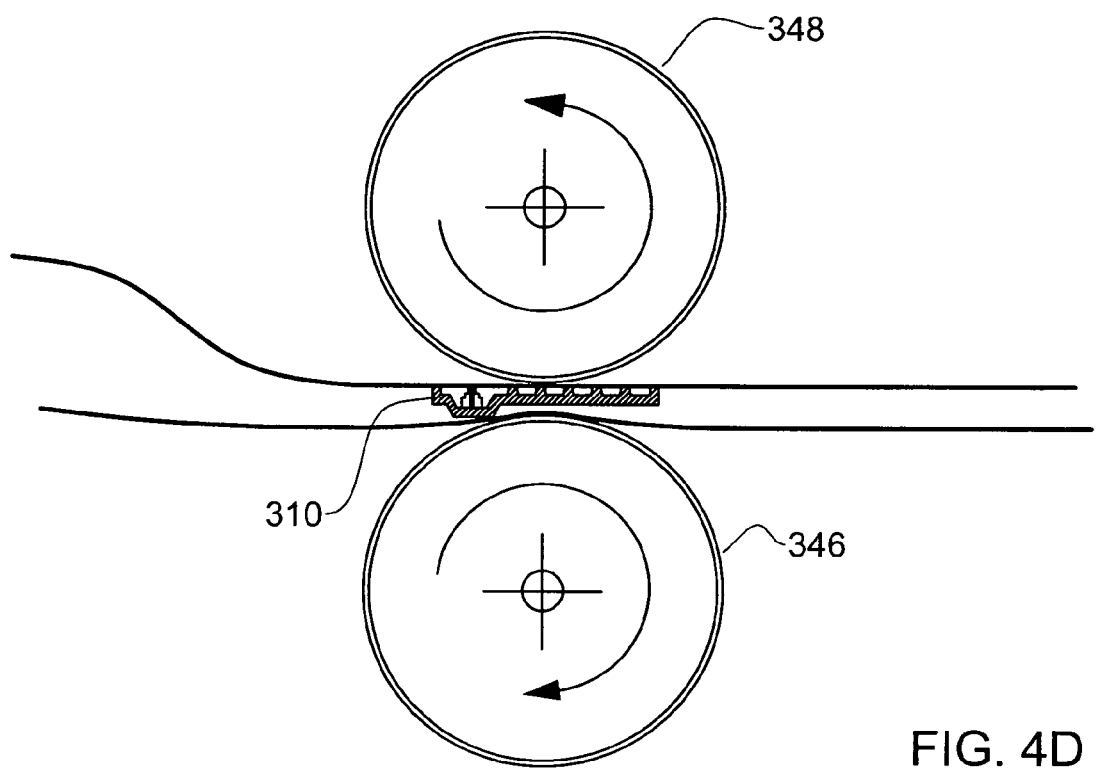
FIG. 4D shows part of the manufacture of an irrigation pipe with the dripper shown in FIG. 4A.
Figure 4E:
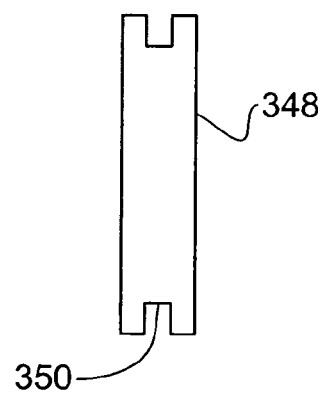
FIG. 4E is a side view of a roller according to the manufacturing steps shown in FIG. 4D.

During manufacture, as seen in FIG. 4D, there is an additional step before cutting as described above. Once the dripper 310 has been attached to the interior of the pipe, it passes between a set of rollers, comprising a rigid lower cylinder 346 adapted to push, through the pipe, the bulge 320 to a fully extended position, and an upper cylinder 348. The upper cylinder 348 is adapted to receive the bulge 320 when it is pushed to its fully extended position. This may be accomplished by the use of a cylinder made of a compressible material, or by the inclusion of a groove 350 (seen in FIG. 4E) adapted to receive the bulge 320. Once the bulge 320 has been extended, the cutting may continue as described above with reference to FIGS. 3B and 3C.

Figure 4F:
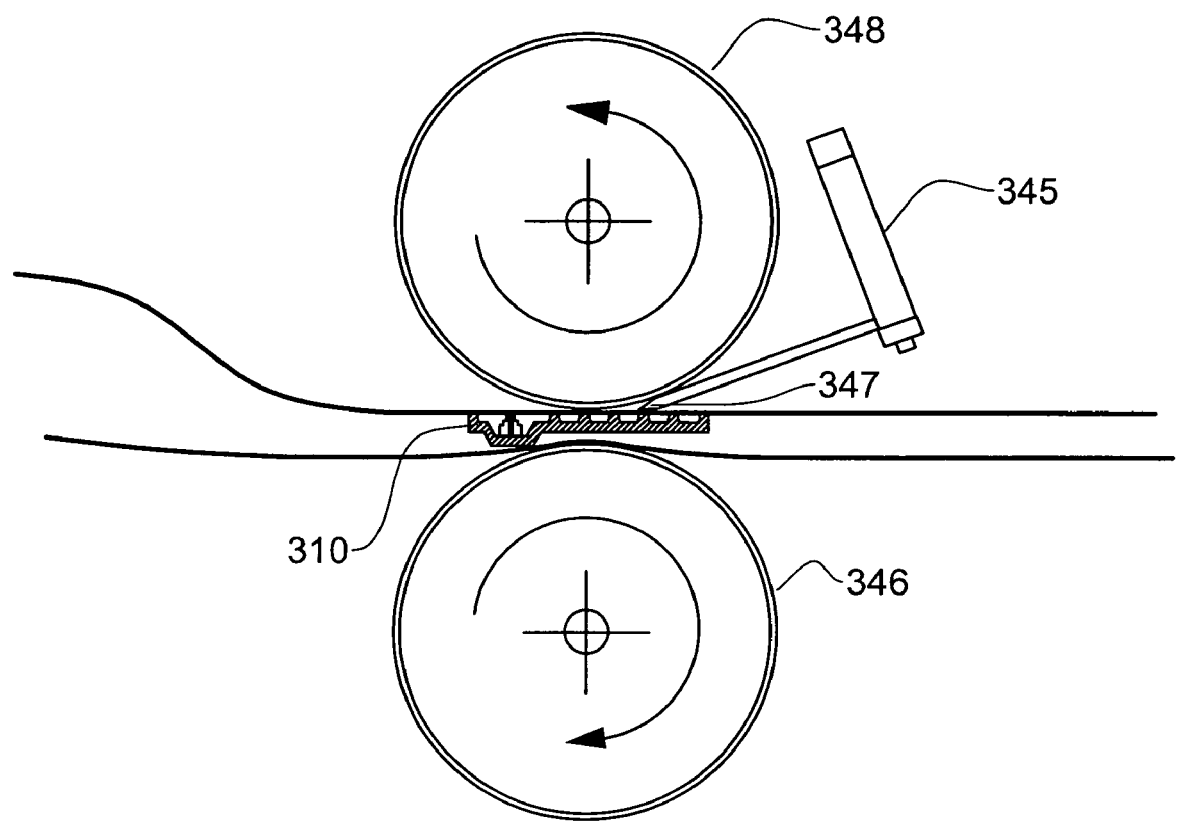
FIG. 4F shows part of the manufacture of an irrigation pipe with the dripper shown in FIG. 4A according to another embodiment.

According to an alternative embodiment, the dripper 310 as shown in FIG. 4A may be self-cutting, i.e., the bulge 320 pierces an opening in the pipe upon its extension. To verify that the hole is properly formed, a probe 345, as shown in FIG. 4F, may be provided. The probe 345 may comprise a sharp edge 347 at its end, useful for ensuring that the opening is properly formed.

Figure 5B:
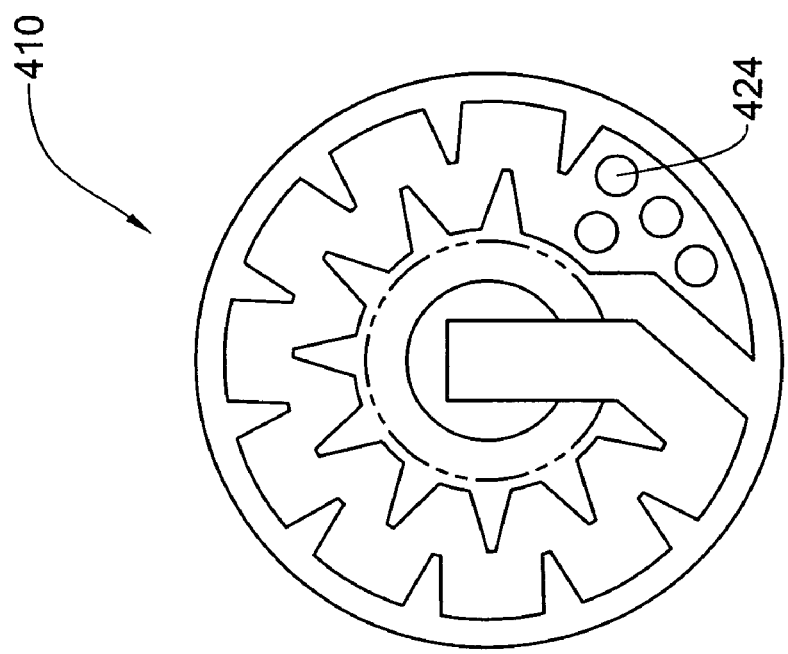
FIG. 5B is a top view of the dripper of FIG. 5A.
Figure 5A:
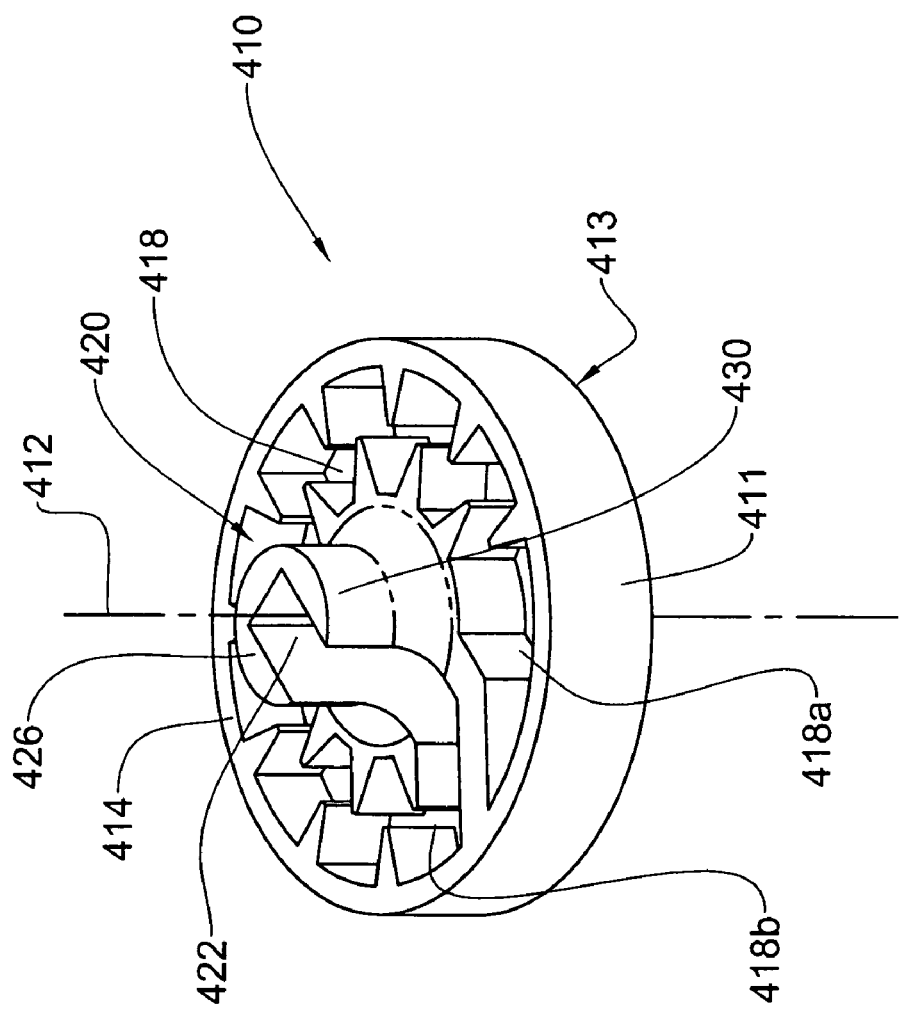
FIG. 5A is a perspective view of another embodiment of a dripper according to the present invention.

FIGS. 5A and 5B illustrate a further embodiment of the present invention. Analogous elements are given the same reference numerals as those of FIG. 1A, however, shifted by 400 (10 to 410, 34 to 434, etc.). A disk shaped dripper 410 comprises an inwardly facing base surface 413 having apertures 424, an outwardly facing surface 414, and a meandering channel 418 having an upstream portion 418a and a downstream portion 418b. The outwardly facing surface 414 has generally circular symmetry about a perpendicular axis 412 which extends through a center of the base surface 413. The outwardly facing surface 414 is intended for bonding to the interior of an irrigation pipe (not shown in FIGS. 5A and 5B). The apertures 424 are in fluid communication with the upstream portion 418a of the meandering channel 418, and serve as inlets for the dipper 410. The dripper 410 further has an outlet area 422 in fluid communication with the downstream portion 418b of the meandering channel 418.

The dripper 410 further comprises a bulge 420 near the outlet area 422. The bulge 420 is constituted by a projection 430 extending in a direction which is parallel to the perpendicular axis 412. As seen in FIG. 5A, the perpendicular axis 412 passes through the middle of the bulge 420 constituted by the projection 430, while projection 430 has an upper surface 426, constituting a portion of the outwardly facing surface 414.

Figure 5C:
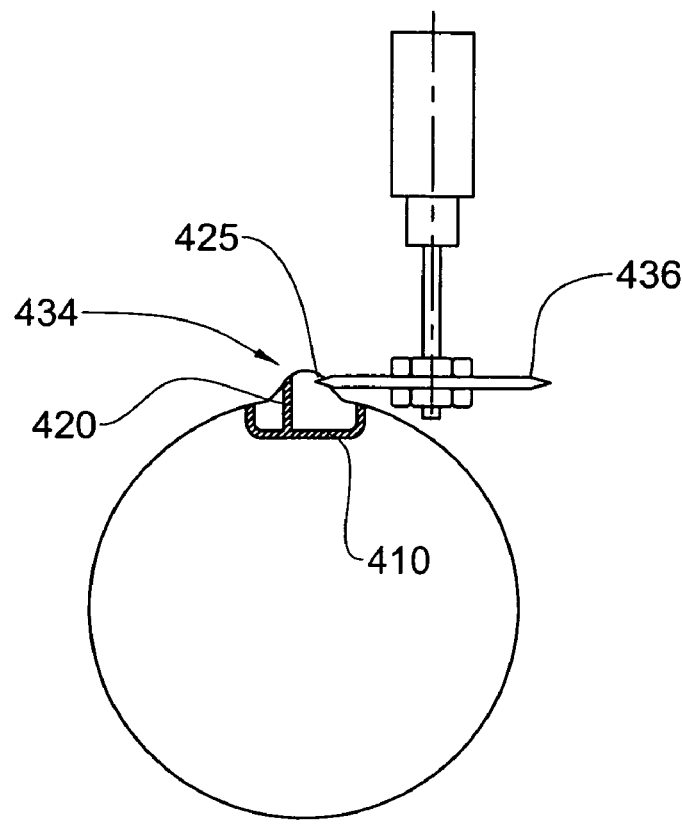
FIGS. 5C and 5D are cross-sectional views of an irrigation pipe with the dripper of FIGS. 5A and 5B bonded thereto during and after cutting according to the present invention.
Figure 5D:
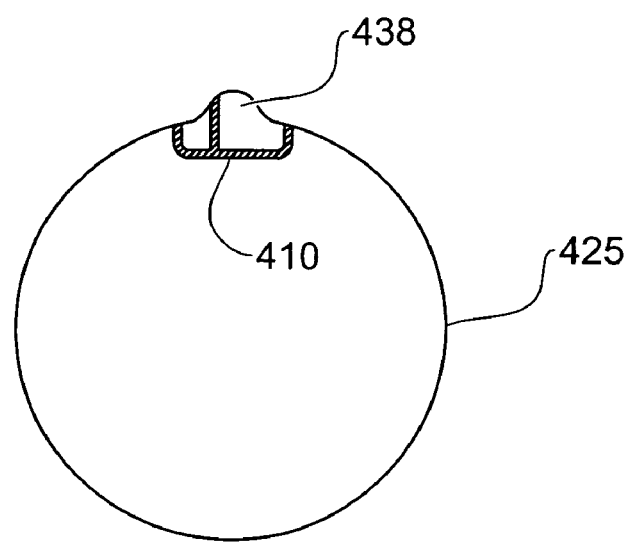

As shown in FIG. 5C, when the outwardly facing surface 414 together with upper surfaces 426 is bonded to the pipe, there is formed a raised portion 434, defined by the projection 430 of the bulge 420, with an outlet region 435 adjacent thereto. A fixed blade 436, either rotating or motionless, is positioned so that the raised portion 434 is engaged thereby at the region 435. As shown in FIG. 5D, a slit 439 is cut into the pipe 425 at the outlet region 435 of the dripper 410, forming thereby an outlet opening 438 in fluid communication with the outlet area 422 of the dripper 410. The outlet opening 438 is formed as a slit.

FIGS. 5C and 5D show the dripper 410 during and after cutting, respectively. The bulge 420 of the dripper 410 is bonded to the interior of an irrigation pipe 425, forming a raised portion 434 of the pipe, defined by the projection 430 of the bulge. A fixed blade 436, either rotating or motionless, is positioned so that the raised portion 434 is engaged thereby at an area adjacent the projection 430. A slit is cut into the pipe 425, forming thereby an outlet opening 438.

It should be appreciated that according any of the above embodiments, the blade may optionally cut a portion of the dripper, e.g., the bulge. However, the cut made in an area of the raised portion which is largely separated from the dripper has some advantages, as described in the embodiments.

Figure 6A:
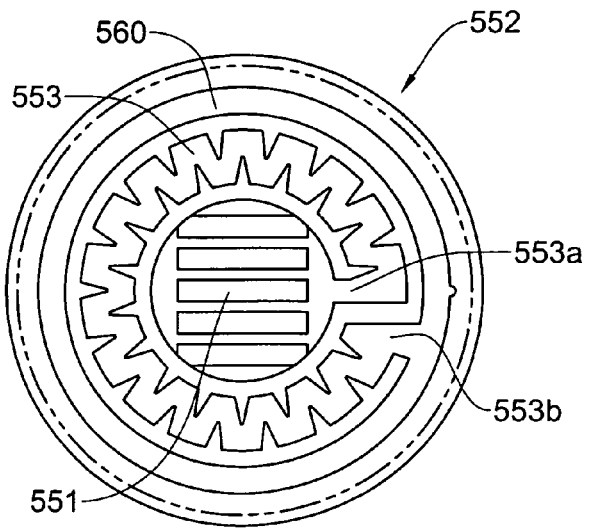
FIG. 6A is a perspective view of the inner surface of an upper housing of a multipart dripper.
Figure 6B:
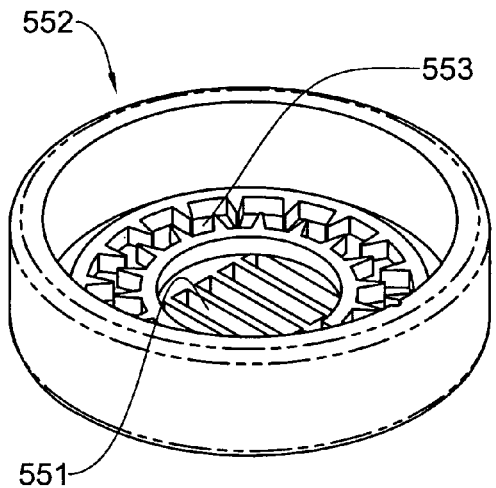
FIG. 6B is a perspective view of the outer surface of the upper housing of FIG. 6A.
Figure 6C:
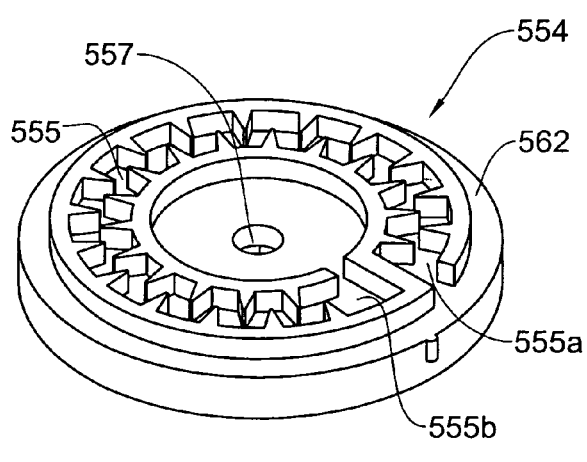
FIG. 6C is a top view of a lower housing of the multipart dripper.
Figure 6D:
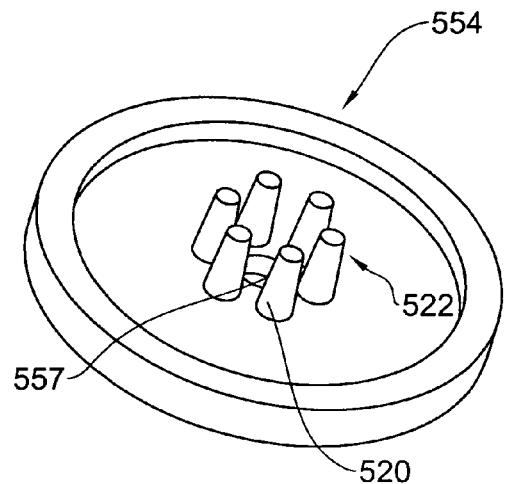
FIG. 6D is a perspective view of the lower housing of FIG. 6C.
Figure 6E:
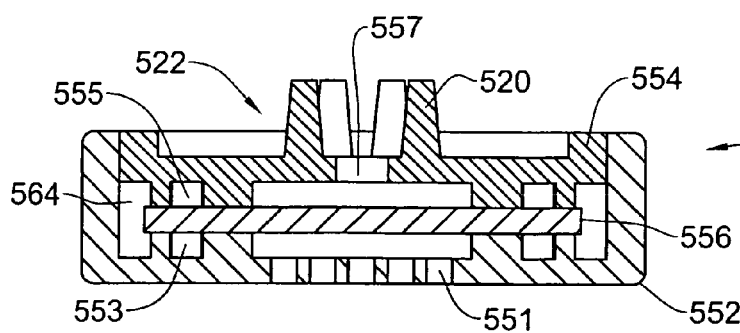
FIG. 6E is a cross-sectional view of the assembled multipart dripper.

It should be noted, that while the dripper discussed herein and shown in the corresponding figures is formed a single piece, the present invention may be carried out using a dripper comprising several pieces, as illustrated in FIGS. 6A through 6E. A dripper 510 of this type typically comprises a cover 552, a base 554, and a membrane 556. The cover 552 comprises an inlet 551 and a first meandering channel 553, having an upstream portion 553a and a downstream portion 553b. The base further comprises an annular groove 560 in fluid communication with the downstream portion 553b of the first meandering channel 553. The base 554 comprises an outlet 557 and a second meandering channel 555, having an upstream portion 555a and a downstream portion 555b. The base further comprises a circumferential shoulder 562 in fluid communication with the upstream portion 555a of the second meandering channel 555. On the side opposite the meandering channel 555, the base 554 further comprises a plurality of bulges 520 surrounding the outlet, defining therebetween an outlet area 522. The three pieces are assembled, typically prior to bonding to a pipe, as shown in FIG. 6E, so that the annular groove 560 and the circumferential shoulder 562 merge to form an enclosed circumferential passage 564.

During operation, water enters the assembled dripper 510 through the inlet 551. The membrane 556 forces the water to enter the first meandering channel 553. Upon exiting the first meandering channel, the water enters the combined circumferential passage 564, then the second meandering channel 555. The water exits the second meandering channel 555 at the outlet 557. The membrane 556 provides pressure compensation for the dripper. When there is an increase in pressure in the pipe, the membrane 556 is forced upwardly towards the outlet 557 accordingly and restrict thereby the flow of water therethrough.

It should be noted that according to several embodiments of the present invention described above, the dripper is bi-directional, that is, it may be bonded to the interior of the pipe wall in either direction parallel to the length of the pipe without effecting how it is cut (for example, those drippers shown in FIGS. 1A, 3A, and 4A). In addition, the drippers illustrated in FIGS. 5A and 6A through 6E are multi-directional drippers, i.e., they may be bonded to the interior of the pipe with any orientation with respect to the flow of water.

FIG. 7A shows one embodiment of a blade specially adapted to cut a pipe 61 with a dripper bonded as described above (not seen in FIG. 7A). A blade 60 comprises two sections 62 having between them a longitudinal channel 64. The sections 62 are held together by a bridging arrangement 63. The channel 64 constitutes a guide for a raised portion 34 of the pipe to pass therein during manufacture. The blade 60 further comprises a triangular notch 66 at a proximal end thereof. The notch 66 is generally symmetric about an axis 65 passing through the channel 64 and is thus useful for centering the pipe in alignment therewith. A distal vertex 68 of the notch 66 merges with the groove 62. At the location of the merge is a cutting arrangement 72, which, according to one embodiment, comprises at least one fixed cutting edge 74. According to another embodiment, shown in FIG. 7B, the cutting edges 74 consist of entire inwardly facing edges 75 of the blade.

Figure 7A:
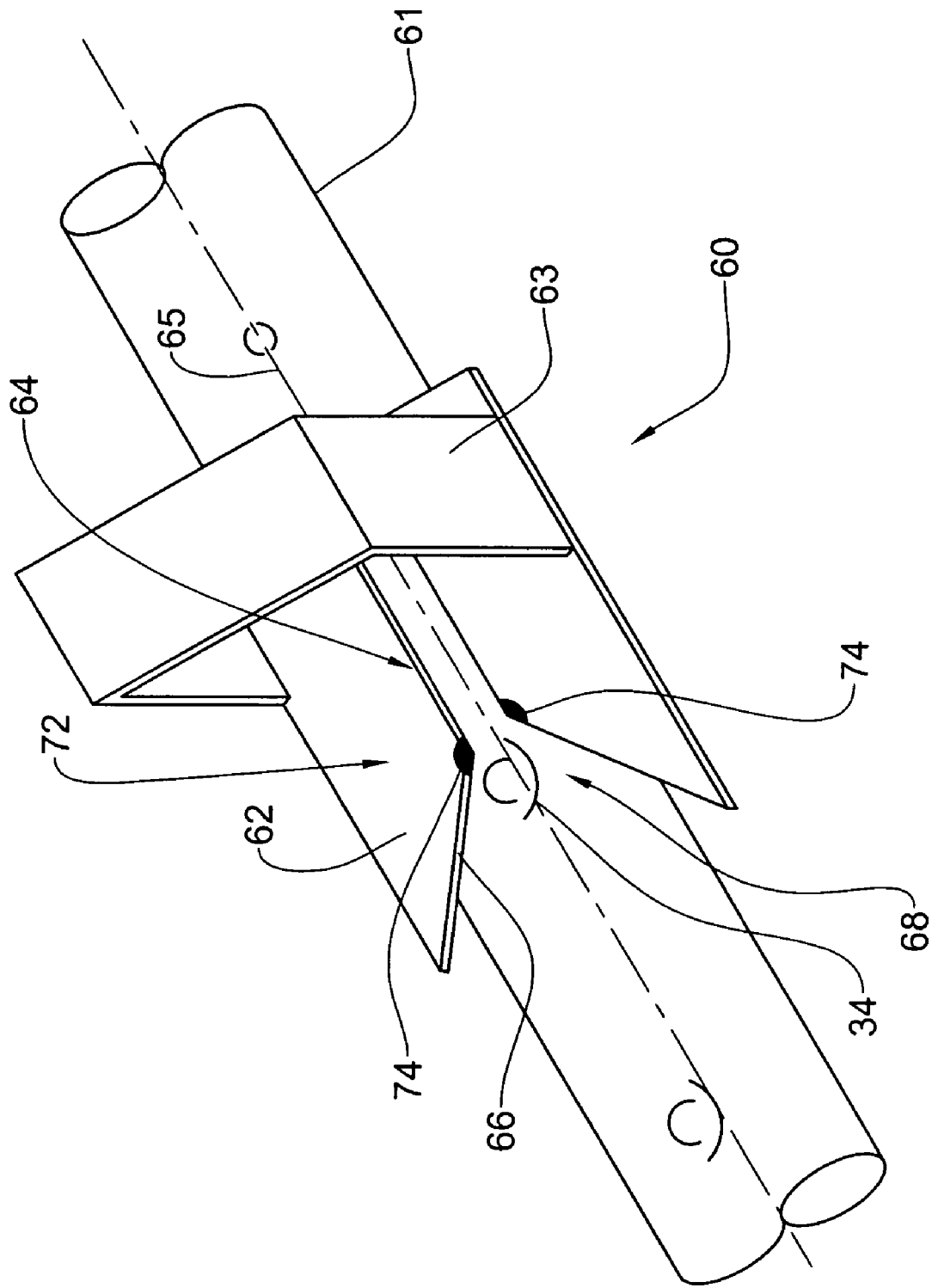
FIG. 7A is a perspective view of a blade according to one embodiment of the present invention.
Figure 7B:
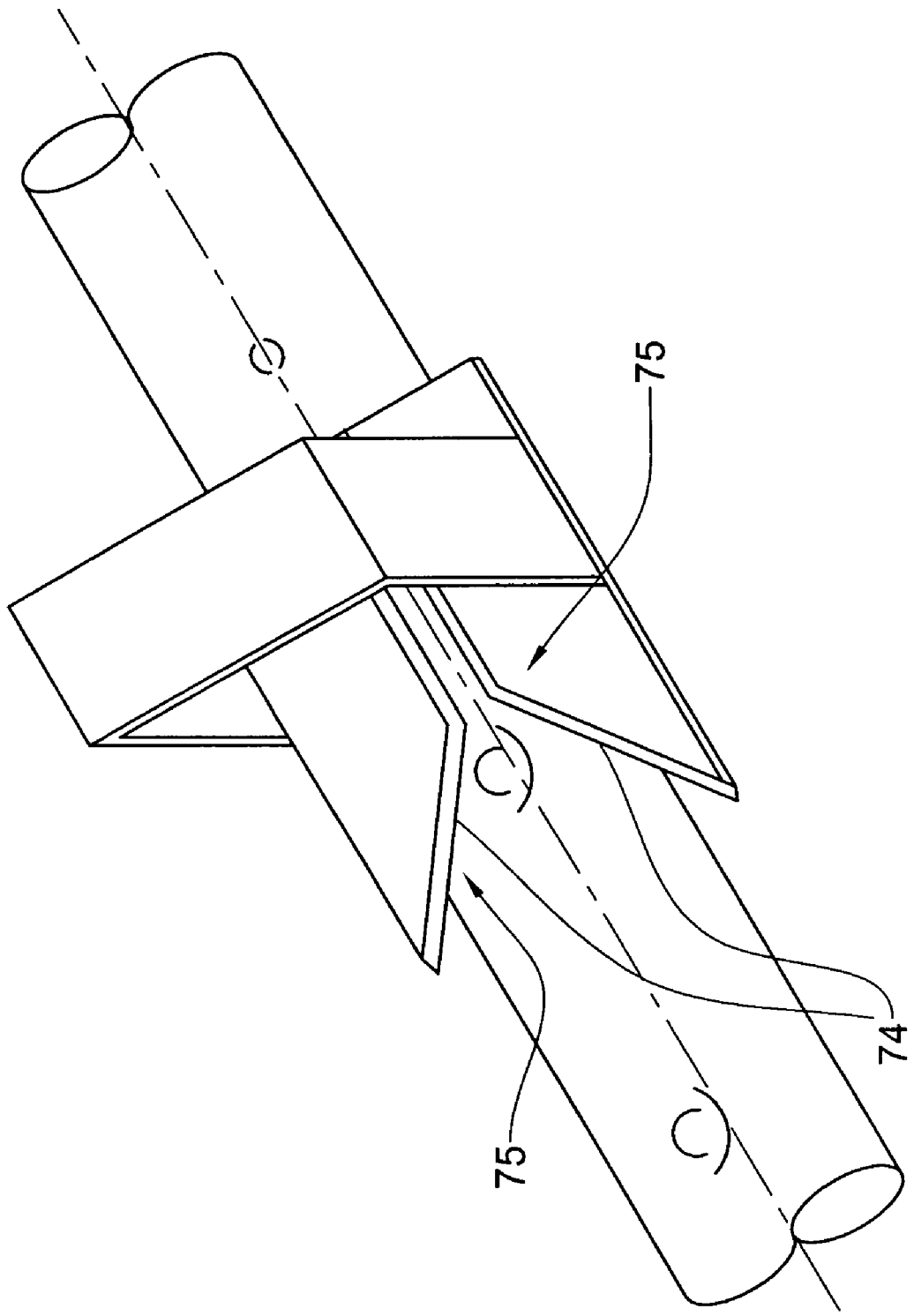
FIG. 7B is a perspective view of a blade according to another embodiment of the present invention.
Figure 7D:
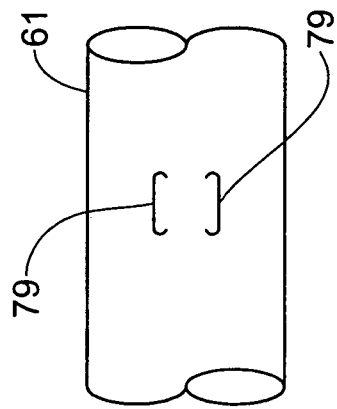
FIGS. 7D and 7E are top views of a section of pipe after cutting using any one of the blades of FIGS. 7A through 7C in accordance to the present invention.
Figure 7E:
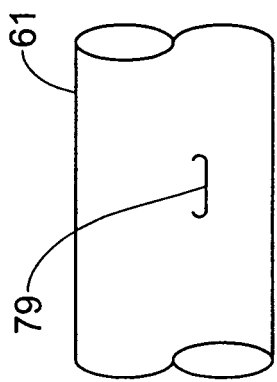
Figure 7C:
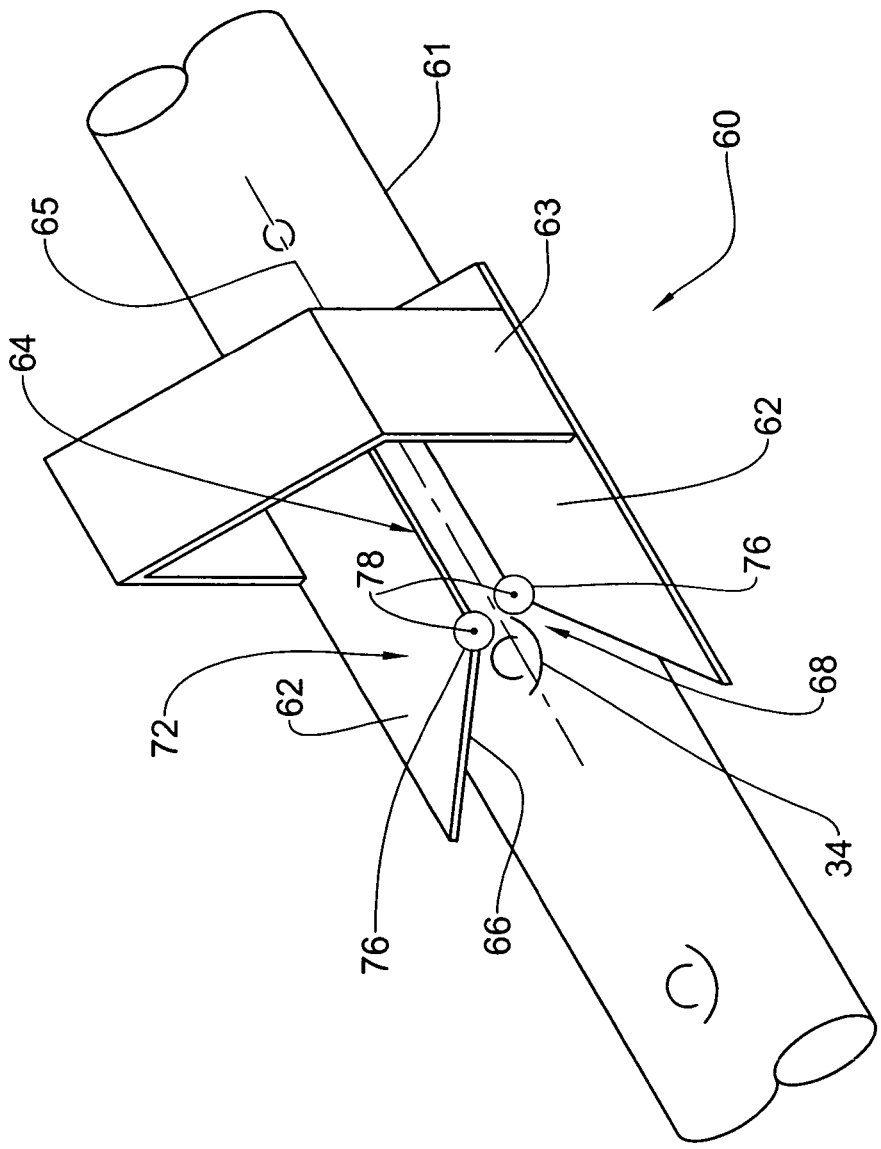
FIG. 7C is a perspective view of a blade according to a further embodiment of the present invention.

According to a further embodiment, shown in FIG. 7C, the cutting arrangement 72 comprises at least one cutting edge 76 which are free to rotate about a pin 78. The rotational movement of these cutting edges 76 is imparted by the passage of the raised portion 34 of the pipe thereby. It should be noted that the cutting edges 76 may alternatively by static (i.e., non-rotating), motor driven, or reciprocating (i.e., moving alternately toward and away from the raised portion 34).

It should further be noted that although in FIG. 7C, the cutting edges 76 are shown disposed above the blade 60, they may be located in any suitable location including, but not limited to, below or within the surface of the blade.

It should be noted that according to any of the embodiments described with reference to one of FIGS. 7A through 7C, a cutting edge may be present on only one side of the channel 64.

FIG. 7D illustrates the pipe 61, as viewed from the outside after cutting by the blade 60. Slits 79 are formed are formed so as to constitute flaps. FIG. 7E illustrates the pipe 61 as viewed from the outside when only one side of the blade 60 has a cutting edge present.

The blade 60 as described above is especially useful for embodiments wherein the raised portion may be cut from the side (e.g., to form a flap). For embodiments where the cut may be made from above (e.g., to form a slit), the blade 60 may be modified so that cutting edge 74 is disposed above the raised portion.

Those skilled in the art to which this invention pertains will readily appreciate that numerous changes, variations and modifications can be made without departing from the scope of the invention mutatis mutandis. For example, the projections need not be formed parallel to the axis or to each other.

The invention claimed is:

1. A dripper adapted to be bonded to an interior of an irrigation pipe during manufacture and to be associated with an outlet opening in said pipe, the dripper comprising:

an outwardly facing surface adapted for the bonding, an outlet area associated with said outwardly facing surface, and at least one element movable from a first position in which the at least one element does not project above the outwardly facing surface to a second position in which the at least one element projects above the outwardly facing surface, said element constituting a bulge, when in said second position, near said outlet area, said bulge defining an outermost portion of said outwardly facing surface at least during manufacture of the pipe, and being adapted to form, when the dripper is bonded to said pipe, a raised outlet region in the pipe associated with said bulge, the bulge and said outlet area being designed so as to form said raised outlet region suitable for at least a part of said outlet opening being formed in said raised outlet region and being defined by the material of the pipe.

2. A dripper according to claim 1, wherein said outwardly facing surface has generally circular symmetry about a perpendicular axis which extends through a center of a base surface of the dripper.

3. A dripper according to claim 2, wherein the perpendicular axis passes in the middle of the bulge.

4. A dripper according to claim 1, wherein the bulge is constituted by a plurality of spaced apart projections.

5. A dripper according to claim 1, wherein the outwardly facing surface has a generally elongated shape and a longitudinal axis.

6. A dripper according to claim 5, wherein the bulge comprises projections on both sides of the longitudinal axis, forming therebetween said outlet area.

7. A dripper according to claim 5, wherein the bulge extends substantially parallel to the longitudinal axis and is offset therefrom.

8. A dripper according to claim 5, wherein the bulge is substantially collinear with the longitudinal axis, said outlet area being on at least one side of the bulge.

9. A dripper according to claim 1, wherein the bulge is adapted to at least partially pierce the pipe upon moving from the first position to the second position, during manufacture of the pipe.

10. A dripper according to claim 1, wherein said dripper comprises a housing and a membrane mounted therein.

11. An irrigation pipe having outlet openings and a plurality of drippers, each dipper comprising:

an outwardly facing surface bonded to the pipe's interior, an outlet area associated with said outwardly facing surface in fluid communication with at least one of said outlet openings, and at least one element movable from a first position in which the at least one element does not project above the outwardly facing surface to a second position in which the at least one element projects above the outwardly facing surface, said element constituting a bulge, when in said second position, near said outlet area, the pipe comprising a raised outlet region associated with said bulge, at least a part of said at least one outlet opening being formed in said raised outlet region and being defined by the material of the pipe.

12. An irrigation pipe according to claim 11, wherein said at least one outlet opening is below the top of the bulge.

13. An irrigation pipe according to claim 11, wherein said at least one outlet opening is at a height of the bulge.

14. An irrigation pipe according to claim 11, wherein said at least one outlet opening is so formed to allow an outflow of water from the pipe due to an elevated internal pressure, and to be at least partially closed upon an absence of said pressure.

15. An irrigation pipe according to claim 11, wherein said at least one outlet opening is in the form of a slit.

16. An irrigation pipe according to claim 11, wherein each dripper further comprises a housing and a membrane mounted therein.

17. A method for producing an irrigation pipe, the method comprising the steps of:
   providing a dripper comprising:
      an outwardly facing surface adapted for bonding to the interior of the pipe,
      an outlet area associated with said outwardly facing surface, and
      at least one element movable from a first position in which the at least one element does not project above the outwardly facing surface to a second position in which the at least one element projects above the outwardly facing surface;
   bonding the dripper to the interior of the pipe; and
   pushing said at least one element towards said second position to facilitate the formation of an outlet opening defined by the material of the pipe.

18. A method according to claim 17, wherein:
   said at least one element in the second position constitutes a bulge near said outlet area, the bulge adapted to form a raised outlet region in the pipe; and
   the outlet opening is formed by cutting the pipe at the raised outlet region.

19. A method according to claim 12, wherein the pipe is cut using a fixed cuffing arrangement.

20. A method according to claim 12, wherein said at least one element in the second position at least partially pierces the pipe to form the outlet opening defined by the material of the pipe.

21. A dripper adapted to be bonded to an interior of an irrigation pipe wall, the dripper comprising
   at least one element movable from a retracted position away from the pipe wall to an extended position in which the at least one element is pushed to the irrigation pipe wall, when the dripper is bonded to an interior of an irrigation pipe.

22. A dripper according to claim 21, wherein in the extended position the at least one element constitutes a bulge which projects out from the dripper.

23. A dripper according to claim 21, wherein in the extended position the at least one element constitutes a bulge which is adapted to form a raised outlet region in the pipe wall.

24. A dripper according to claim 21, wherein in the extended position the at least one element constitutes a bulge which is adapted to at least partially pierce an opening in the pipe wall.

* * * * *